UNITED STATES PATENT OFFICE.

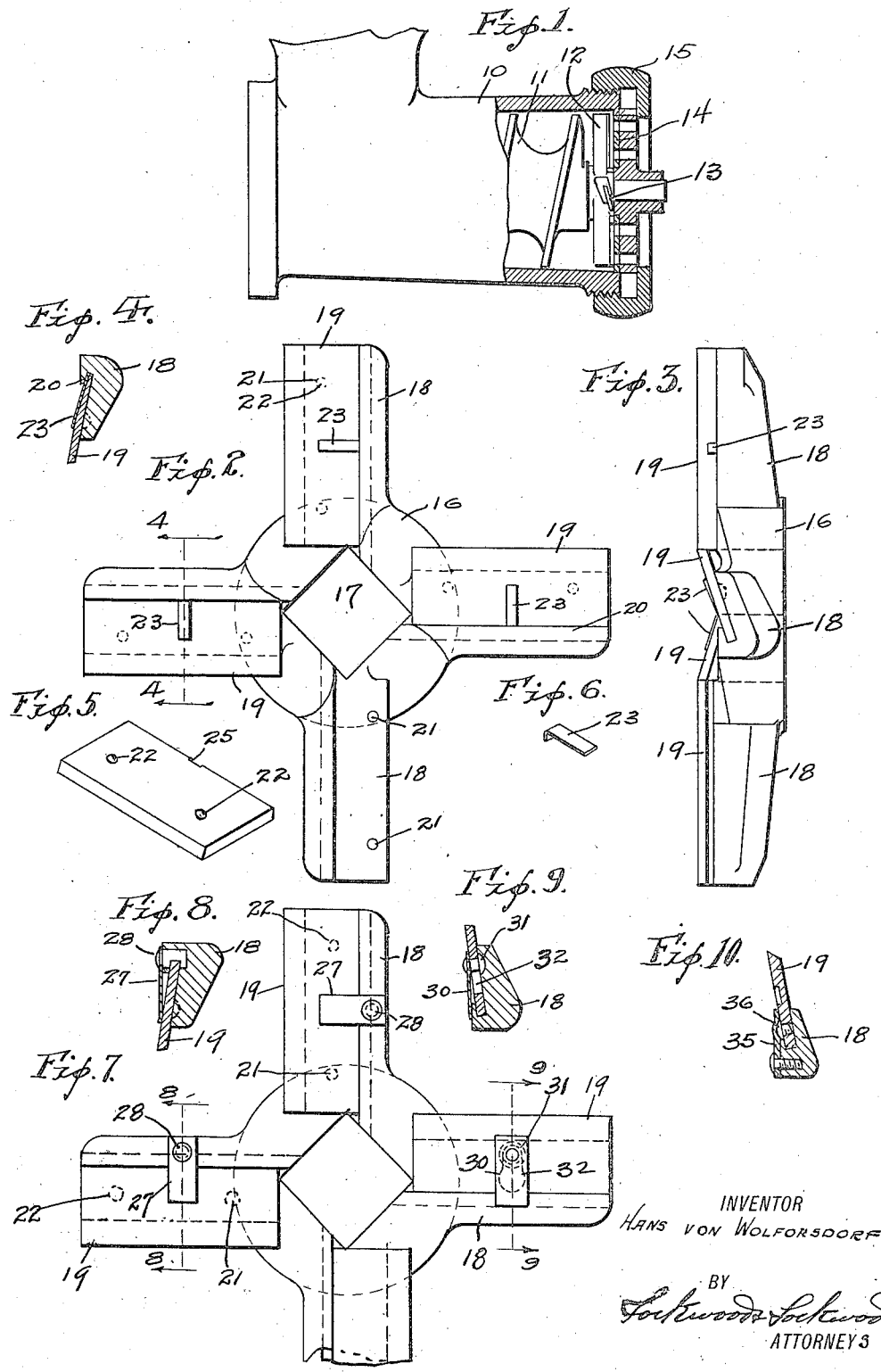

HANS VON WOLFORSDORF, OF INDIANAPOLIS, INDIANA.

MEAT-CUTTING KNIFE.

1,239,237. Specification of Letters Patent. Patented Sept. 4, 1917.

Application filed September 16, 1916. Serial No. 120,587.

*To all whom it may concern:*

Be it known that I, HANS VON WOLFORSDORF, a citizen of the United States, and a resident of Indianapolis, county of Marion, and State of Indiana, have invented a certain new and useful Meat-Cutting Knife; and I do hereby declare that the following is a full, clear, and exact description thereof, reference being had to the accompanying drawings, in which like letters refer to like parts.

The object of this invention is to provide a meat cutting knife which is commonly used upon meat cutters with removable knife blades such as will overcome many of the objections of the knives which are now in use. The ordinary cutting knife is composed of four blades which from time to time must be removed in order to be replaced, cleaned or sharpened. The common means of securing these blades to the holder is by use of a set screw which becomes rusted in the holder so that the blade cannot be removed without drilling out the set screw causing unnecessary inconvenience and labor, or, on the other hand, the vibration of the knife loosens the set screw sufficiently to allow the knife to slide in the slot of the holder and obtain such a position as will eventually destroy the cutting knife.

The main feature of this invention is to provide blades which will be removably secured in the cutting knife by means of a spring and certain projections which will hold the knife blade securely in place so as to prevent its sliding in the holding groove and still allow it to be easily and readily removed.

The full nature of the invention will be understood from the accompanying drawings and the following description and claims:

In the drawings, Figure 1 is a side elevation of a meat grinding machine with parts thereof removed. Fig. 2 is a plan view of the meat cutting knife. Fig. 3 is a side elevation of the meat cutting knife. Fig. 4 is a cross section through the line 4—4 of Fig. 2. Fig. 5 is a perspective view of a knife blade. Fig. 6 is a perspective view of the retaining spring. Fig. 7 shows a modified plan view of the meat cutting knife showing other forms of springs for securing the blades thereto. Fig. 8 is a section on the line 8—8 of Fig. 7. Fig. 9 is a section on the line 9—9 of Fig. 7. Fig. 10 is a cross section through the knife blade and holder showing a modified view thereof.

In the drawings, there is a meat chopper 10 having a spiral feeding screw 11 on the end of which is the meat cutting knife 12 which revolves with said screw and has removably secured therein the knife blades 13 which revolve adjacent to a perforated meat grinding plate 14, which plate is held in place by the housing 15.

The meat cutting knife has a hub member 16 in the center of which is a rectangular opening 17 which fits onto the rectangular shaft of the spiral feeding screw 11 so as to revolve therewith. Projecting from said hub is a plurality of knife blade holders 18 to which are removably secured the knife blades 19. The holders 18 are provided with a slanting surface against which the blades are adapted to rest and an overlapping flange 20 which provides a retaining groove into which the blades are inserted. Substantially at each end of the blade holders 18 there are depressions 21 into which the projections 22 on the knife blades extend so that as long as the knife blade is held against the surface of said blade holders, the projections 22 registering with the depressions 21 will prevent any lateral movement thereof.

There is a retaining spring 23 which has one end turned at right angles for removably securing the knife blade in position. The spring lies flat upon the outer surface of the blade in a groove thereon so that the bent end thereof extends downward over the inner edge of the blade in a groove 25. The blade and spring are then inserted under the flange 20 of the blade holder 18 whereby said flange engages the spring which bears against the blade and forces it under tension against said holder. When the blade is finally in place, the projections 22 drop into the depressions 21 which securely holds the blade. If it is desired to remove the blade, it is forced outward by a slight pressure which will overcome the tension of the spring until the projections 22 are out of engagement with the depressions 21 and thereupon slid out of engagement with said blade holder.

Other forms of springs may be used, the invention not being restricted to any particular spring. Fig. 8 shows a spring 27 riveted to the blade holder 18 at 28 so that its outer end may engage the knife blade and hold it securely against the surface of the blade holder wherein the projections 22 and recesses 21 will prevent its lateral movement. Fig. 9 shows another form of spring 30 which has a bolt head 31 secured at one end thereof. Said blade has a slot 32 which is larger at one end than at the other so that the bolt head may be inserted through one end thereof as the knife blade is placed in position to engage the flange 20 of the holder and when it is forced under said flange, the bolt head slides into the smaller portion of the slot 32 so that the bolt head is engaged and held therein, said bolt head also projecting into a depression in the holder so as to prevent any lateral movement. Fig. 10 shows another type of spring 35 which is bent so as to have a slight concavity and is secured at one end to the holder so that the other end projects outwardly over the blade. The blade has a projection 36 which fits snugly in and engages the concavity of said spring which removably secures said blade to the holder.

The invention claimed is:

1. In combination with a meat cutting knife including a hub, a knife blade holder extending outwardly therefrom having a flange for forming a groove therein, and a knife blade, of means for preventing the lateral movement of said blade and a removable spring member adapted to be inserted between the blade and flange for removably securing said blade to the holder.

2. In combination with a meat cutting knife including a hub, a knife blade holder extending outwardly therefrom, having a flange for forming a groove therein, and a knife blade, of means for preventing the lateral movement of said blade, and a removable spring member having one end bent so as to overlap the inner edge of said knife blade so as to lie between said flange and blade for removably securing it to the holder.

3. A meat cutting knife including a hub, knife blade holders extending outwardly therefrom and having flanges for forming grooves therein, knife blades, a spring member having one end bent so as to overlap the inner edge of said knife blade so as to lie between said flange and knife blade for removably securing it to said holder, and projections on said knife blade adapted to engage said holder for preventing any lateral play.

In witness whereof, I have hereunto affixed my signature.

HANS von WOLFORSDORF.

Copies of this patent may be obtained for five cents each, by addressing the "Commissioner of Patents, Washington, D. C."